United States Patent [19]

Nishikawa et al.

[11] Patent Number: 4,643,049

[45] Date of Patent: Feb. 17, 1987

[54] CONTROL SYSTEM FOR A HYDRAULIC TRANSMISSION TO PREVENT VEHICLE CREEP

[75] Inventors: Masao Nishikawa, Tokyo; Takashi Aoki, Fujimi; Yoichi Sato, Wako; Hiroshi Yoshizawa, Kamifukuoka, all of Japan

[73] Assignee: Honda Giken Kogyo Kabushiki Kaisha, Tokyo, Japan

[21] Appl. No.: 788,520

[22] Filed: Oct. 18, 1985

Related U.S. Application Data

[63] Continuation of Ser. No. 534,214, Sep. 20, 1983, abandoned.

[51] Int. Cl.$^4$ .............................................. B60K 41/06
[52] U.S. Cl. ...................................... 74/868; 74/867; 74/877; 192/0.076
[58] Field of Search .................. 74/752 A, 752 C, 867, 74/868, 869, 877; 192/0.076

[56] References Cited

U.S. PATENT DOCUMENTS

| | | | |
|---|---|---|---|
| 3,958,466 | 5/1976 | Espenschied | 74/867 |
| 4,046,032 | 9/1977 | Braun et al. | 74/877 X |
| 4,052,930 | 10/1977 | Hiramatsu et al. | 74/869 X |
| 4,086,992 | 5/1978 | Hamada et al. | 192/0.076 |
| 4,098,148 | 7/1978 | Wayman | 74/868 X |
| 4,291,596 | 9/1981 | Sakakibara | 74/867 |
| 4,313,353 | 2/1982 | Honig | 74/861 X |
| 4,331,045 | 5/1982 | Piech et al. | 74/867 |
| 4,388,844 | 6/1983 | Arai et al. | 74/752 C |

FOREIGN PATENT DOCUMENTS

| | | | |
|---|---|---|---|
| 2545798 | 4/1977 | Fed. Rep. of Germany | 74/867 |
| 3019274 | 11/1981 | Fed. Rep. of Germany | 74/866 |
| 49-5772 | 2/1974 | Japan | |

Primary Examiner—Leslie A. Braun
Assistant Examiner—Dwight G. Diehl
Attorney, Agent, or Firm—Armstrong, Nikaido, Marmelstein & Kubovcik

[57] ABSTRACT

A hydraulic shift transmission for a vehicle including a hydraulic torque converter for transmitting the engine torque to a road wheel driving system. The hydraulic shift transmission comprises a first speed gear train interposed between the hydraulic torque converter and the road wheel driving system, a hydraulic clutch installed in the first speed gear train, a hydraulic control system for supplying a hydraulic pressure through an oil supply line to the clutch, a relief valve mechanism, provided for the supply line, for releasing the hydraulic pressure while the vehicle speed is lower than preset reference value with the engine idling, an oil return port open relative to the supply line and releasing the hydraulic pressure while opened, a piston member for, when slided in either axial direction thereof, closing the return port, a resilient member normally biasing the piston member in the axial direction, and a hydraulic circuit for, at least either when the vehicle speed becomes higher than the preset reference value or the engine is accelerated, gradually urging the piston member in the axial direction.

13 Claims, 5 Drawing Figures

CONTROL SYSTEM FOR A HYDRAULIC TRANSMISSION TO PREVENT VEHICLE CREEP

This application is a continuation of application Ser. No. 534,214 filed Sept. 20, 1983, now abandoned.

BACKGROUND OF THE INVENTION

1. Field of the Invention

The present invention relates to a hydraulic shift transmission for vehicles. Particularly, it relates to a hydraulic shift transmission for a vehicle including a hydraulic torque converter for transmitting the engine torque to a road wheel driving system.

2. Description of Relevant Art

In the art of vehicles in which engine torque is transmitted through a hydraulic torque converter to a road wheel driving system, there have been employed a variety of hydraulic shift transmissions including a plurality of gear trains interposed between the hydraulic torque converter and the road wheel driving system. The gear trains generally have their ratios different from one another. A plurality of clutch mechanisms are alternatively installed in the gear trains. The clutch mechanisms each are hydraulically connectable and disconnectable. A hydraulic system is provided for supplying hydraulic oil to the clutch mechanisms in accordance with shift operations.

In conventional hydraulic shift transmissions of such type, as an object to be solved there has been a problem of what is called "creep", that is, in the state where a shift lever provided in the vicinity of driver's seat is placed in its advance position such as when waiting for a signal or in a traffic snarl, even while the vehicle is stopped, the torque of an engine idling may be transmitted to road wheels, thus causing the vehicle to advance opposing the driver's intention.

This "creep" has been avoided by footing a braking pedal, thus needing the driver to be alert and to intentionally keep a firm footing on the braking pedal. Additionally, the engine throttle valve is kept excessively open for the stirring torque of a hydraulic converter, thereby raising the fuel consumption rate. This results in a disadvantage from the viewpoint of energy saving.

On this account, there have been provided a number of appreciable proposals for solving these problems such as an interruption of the hydraulic oil supply to a first speed clutch as the vehicle is stopped with the engine idling, as disclosed by the Japanese Patent Publication No. 49-5772, for example.

Yet, for the employment of such proposal, new proposals have developed such as that, when changing the foot onto the acceleration pedal to start the vehicle, a starting shock is to be felt, accompanying such disadvantages that, for improvements in this respect, it has been hardly successful to rely on conventional measures without introducing a large-sized or complex device.

The present invention has been achieved to effectively solve such problems and disadvantages in conventional hydraulic shift transmissions.

OBJECT AND SUMMARY OF THE INVENTION

An object of the present invention is to provide a hydraulic shift transmission for a vehicle including a hydraulic torque converter for transmitting the engine torque to a road wheel driving system, which permits the "creep" of vehicle to be prevented with a simple arrangement, while concurrently preventing the occurrence of the starting shock.

According to the present invention there is provided a hydraulic shift transmission for a vehicle including a hydraulic torque converter for transmitting torque from an engine to a road wheel driving system, comprising a plurality of gear trains interposed between the hydraulic torque converter and the road wheel driving system, the gear trains being different in the gear ratio, the gear trains including a first speed gear train adapted for the running at relatively low speeds, a plurality of clutch mechanisms alternatively installed in the gear trains, the clutch mechanisms being each hydraulically connectable and disconnectable, the clutch mechanisms including a first speed clutch mechanism installed in the first speed gear train, a hydraulic control system for selectively supplying a hydraulic pressure to the clutch mechanisms in accordance with shift operations, an oil supply line connecting the hydraulic control mechanism to the first speed clutch mechanism, a relief valve mechanism provided for the oil supply line for releasing the hydraulic pressure while the vehicle speed is lower than a preset reference value with the engine idling, an oil return port open relative to the oil supply line and releasing the hydraulic pressure while opening, a piston member for, when slided in either axial direction thereof, closing the return port, a resilient member normally biassing the piston member in the axial direction, and a hydraulic circuit for, at least either when the vehicle speed becomes higher than the preset reference value or the engine is accelerated, gradually urging the piston member in the axial direction.

BRIEF DESCRIPTION OF THE DRAWINGS

The above and further features, objects and advantages of the present invention will more fully appear from the following detailed description of the preferred embodiments of the invention when the same is read in conjunction with the accompanying drawings wherein.

DETAILED DESCRIPTION OF PREFERRED EMBODIMENTS

Figure 1:
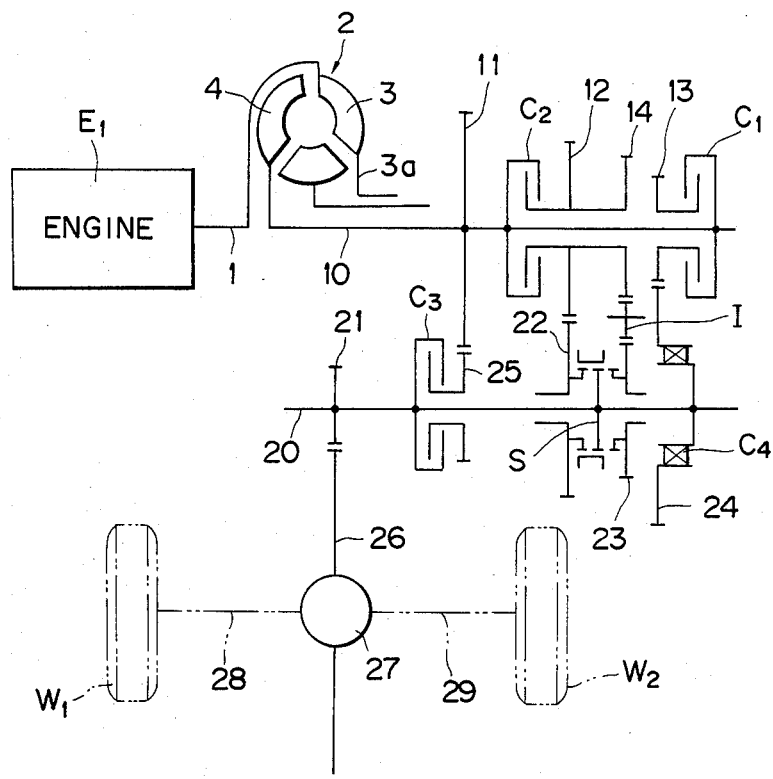
FIG. 1 is a transmission system diagram of a hydraulic shift transmission for vehicles according to a first embodiment of the invention.

Referring first to FIG. 1, an engine E1 has an output shaft 1 which is coupled with a pump 3 of a hydraulic torque converter 2. The pump 3 has its shaft 3a connected to a hydraulic braking pump P shown in FIG. 2.

The torque converter 2 includes a turbine 4 coupled with a main shaft 10 which has, in order from the left in FIG. 1, a third speed gear 11, a second speed clutch C2 and a first speed clutch C1 fixed each thereto. The main shaft 10 is further provided with a second speed drive gear 12 and a first speed drive gear 13 loose-fitted thereon so as to be integrally rotatable therewith when the second and first speed clutches C2, C1 are brought in engagement, respectively. The second speed drive gear 12 is integrally provided with a reverse drive gear 14.

In parallel with the main shaft 10, there is disposed a countershaft 20 having fixed thereto, in order from the left of FIG. 1, a final drive gear 21, a third speed clutch C3, a spline S selectively engageable with a second speed driven gear 22 and a reverse driven gear 23, and a first speed driven gear 24. The first speed driven gear 24 includes a one-way clutch C4 for transmitting the torque from the main shaft 10 only in the direction to the countershaft 20.

The countershaft 20 has thereon a third speed driven gear 25, a second speed driven gear 22, and a reverse driven gear 23 loose-fitted to be rotatable relative to one another, the third speed driven gear 25 being arranged to be integrally rotatable with the third speed clutch C3 as brought in engagement therewith. The reverse gears 14 and 23 are engaged with each other through an idle gear I put therebetween.

The final drive gear 21 is engaged with a final driven gear 26 which is in engagement with a differential gear 27. Left and right axles 28, 29 extend from the differential gear 27 and are connected to left and right wheels W1, W2, respectively.

Figure 2:
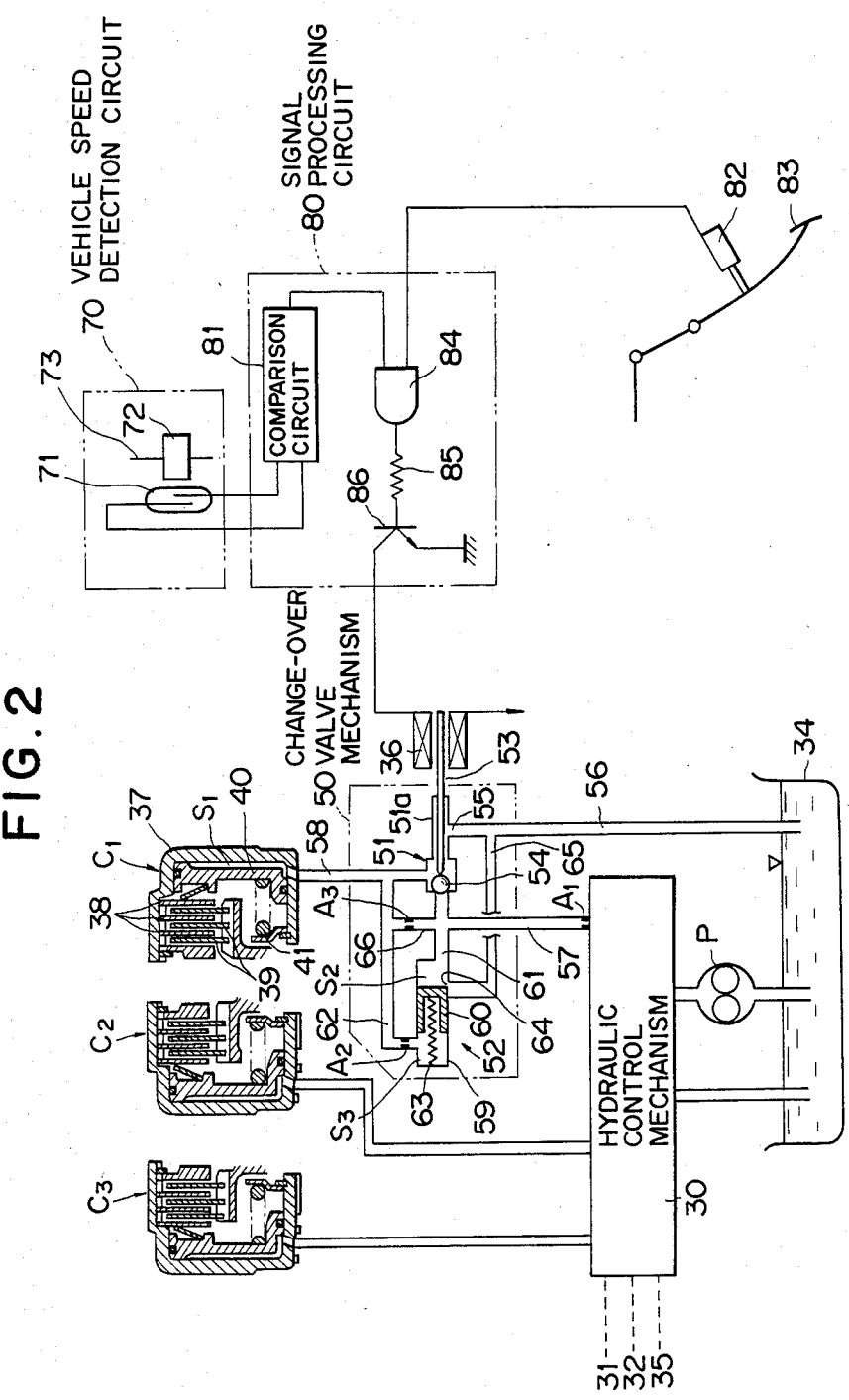
FIG. 2 is an electro-hydraulic circuit block diagram of the hydraulic shift transmission of FIG. 1, including sectional views of essential parts.

Referring now to FIG. 2, there will be described hereinbelow the arrangement of electric and hydraulic systems of the hydraulic shift transmission according to the first embodiment of the invention.

In FIG. 2, a hydraulic control mechanism 30 supplies the deliver pressure of the pump P, which is installed between this mechanism 30 and an oil reservoir 34 opened to the atmosphere, to the first, second and third clutches C1, C2 and C3 selectively in response to signals such as a vehicle speed signal 31 and a throttle opening signal 32. The control mechanism 30 may be of a fully hydraulic type, a type using solenoid valves or any other suitable type. Moreover, the control mechanism 30 may receive a torque conversion ratio signal 35 representing the torque conversion ratio of the torque converter 2 in order to render variable the delivery pressure itself of the pump P.

Between the hydraulic control mechanism 30 and the first speed clutch C1, there is provided a pressure release mechanism 50 operable with a solenoid 36 for causing the clutch C1 to communicate with the control mechanism 30 and the oil reservoir 34 selectively in accordance with a signal from a signal processing circuit 80.

As is apparent from the upper half sectional view shown in FIG. 2, the clutch C1 is composed of a clutch outer member 37 fitted on the main shaft 10, a plurality of clutch plates 38 engaged with the clutch outer member 37, a plurality of friction plates 39 positioned between corresponding clutch plates 38 and arranged to be integrally rotatable with the first speed drive gear 13, and a piston as a hydraulic engagement member 40 slideably fitted in the clutch outer member 37 and normally biassed in the disengagement direction thereof or to the right in FIG. 2. At the back of the engagement member 40 or on the right thereof in FIG. 2, there is formed a hydraulic chamber S1 selectively communicatable through the pressure release mechanism 50 with the hydraulic control mechanism 30. For the second and third speed clutches C2, C3, which are similar to the first speed clutch C1, no description will be given about the constitution.

The pressure release mechanism 50 comprises a ball valve 51 for connecting the first speed clutch C1 to the oil reservoir 34 when the solenoid 36 is energized, and a pressure progressive-increase mechanism 52. The ball valve 51 has a throat portion 51a provided therethrough with a push rod 53 which is abutted at the distal end part thereof or at the left end thereof in FIG. 2 with a ball 54. The throat portion 51a has a drain port 55 opened thereto and is communicating through an oil path 56 with the oil reservoir 34. Moreover, the ball valve 51 is communicating at the upstream side thereof or at the left side thereof in FIG. 2 through an oil path 57 with the hydraulic control mechanism 30, the oil path 57 being provided with an orifice A1, and at the downstream side thereof or on the upside thereof in FIG. 2 through an oil path 58 with the hydraulic chamber S1 in the first speed clutch C1.

The pressure progressive-increase mechanism 52 consists of a cylinder 59 provided with a piston 60 slidably fitted therein. In the cylinder 59, there are formed two chambers S2 and S3 separated by the piston 60 from each other. The chamber S2 is communicating through an oil path 61 with the oil path 57 upstream of the ball valve 51, while the chamber S3 is communicating through an oil path 62 with the oil path 58 downstream of the ball valve 51, the oil path 62 being provided with an orifice A2 installed therein, and has a spring 63 compressed to be provided therein as shown in FIG. 2. The cylinder 59 has a return port 64 opened to the side wall thereof, thereby selectively communicating with the oil reservoir 34 through an oil path 65 joining the oil path 56. The oil paths 61 and 62 are connected to each other through an oil path 66 having an orifice A3 installed therein.

Further, in FIG. 2, a vehicle speed detection circuit 70 is provided for a magnetic detection of the vehicle speed. The vehicle speed detection circuit 70 consists of a reed switch 71 and a magnet 72 provided on a speedometer cable 73 of which rotating speed is detected by the reed switch 71. The detected vehicle speed is input, in the signal processing circuit 80, into a comparison circuit 81, in which it is compared with a preset reference value and verified to be higher or lower than the reference value and from which, according to the result of comparison, a threshold signal of high or low level is output.

On the other hand, in FIG. 2, an idle detection switch 82 outputs a threshold signal of high level during an idle state in which an acceleration pedal 83 is not footed to be actuated.

The signals output from the comparison circuit 81 and the idle detection switch 82 are respectively led to an AND circuit 84 in the signal processing circuit 80. The AND circuit 84 is provided with an output line connected through a resistance 85 to the base of a power transistor 86 which has the emitter thereof grounded and the collector thereof connected to a solenoid 36 and, further therethrough, though not shown, through an ignition switch to the plus terminal of a battery.

In conjunction with FIGS. 1 to 3, there will be described hereinbelow the function of the foregoing hydraulic shift transmission.

While the vehicle speed is lower than the preset reference value and the acceleration pedal 83 is positioned in its idle position, or in other words, when the AND circuit 84 has the input signals thereof composed of their high levels, the power transistor 86 will be on, thus energizing the solenoid 36 and thereby causing, at the ball valve 51, the push rod 53 to push the ball 54 to the left in FIG. 2, so that the first speed clutch C1 stays in communication with the hydraulic control mechanism 30 only through the orifices A1 and A3.

In the above state, in which the first speed clutch C1 is in communication with the oil reservoir 34 through the ball valve 51, the hydraulic chamber S1 in the clutch C1 will have a relatively weak pressure P1 applied thereto from the hydraulic control mechanism 30. The pressure P1 is determined from the relation between the orifices A1, A3 and an orifice effect of the throat portion 51a of the ball valve 51 so as to be smaller than a preset load of the spring 41 in the clutch C1. Thus the clutch C1 is not brought in engagement, while the pressure P1 is strong enough to expel air bubbles in the related hydraulic circuit thereby to fill up the hydraulic circuit with oil, thus permitting a rapid connection or engagement of the clutch C1.

At the same time, the hydraulic chamber S3 in the cylinder 59 will be subjected to the weak pressure P1 as introduced thereto through the orifice A2, so that upstream of the orifice A3 there is prevailing a pressure corresponding to the sum of the pressure in the chamber S3 and the resilient force of the spring 63.

In due course, when the input signals of the AND circuit 84 have their levels both or either rendered low, namely, when the vehicle speed is raised to be higher than the preset reference value and/or the acceleration pedal 83 is pressed, the power transistor 86 will become non-conductive, deenergizing the solenoid 36, thereby causing the ball 54 of the ball valve 51 to move rightwards in FIG. 2 with the oil pressure prevailing upstream of the orifice A3 and thus closing the throat portion 51a relative to the oil reservoir 34. Then, the hydraulic chamber S1 of the first speed clutch C1 will be supplied with an oil pressure P2 higher than the weak pressure P1 by a pressure loss $\Delta P$ which has been produced across the orifice A3. The oil pressure P2 will cause, in the clutch C1, the hydraulic engagement member 40 to start moving leftwards in FIG. 2 opposing the spring 41 to bring the clutch C1 into engagement.

Figure 3:
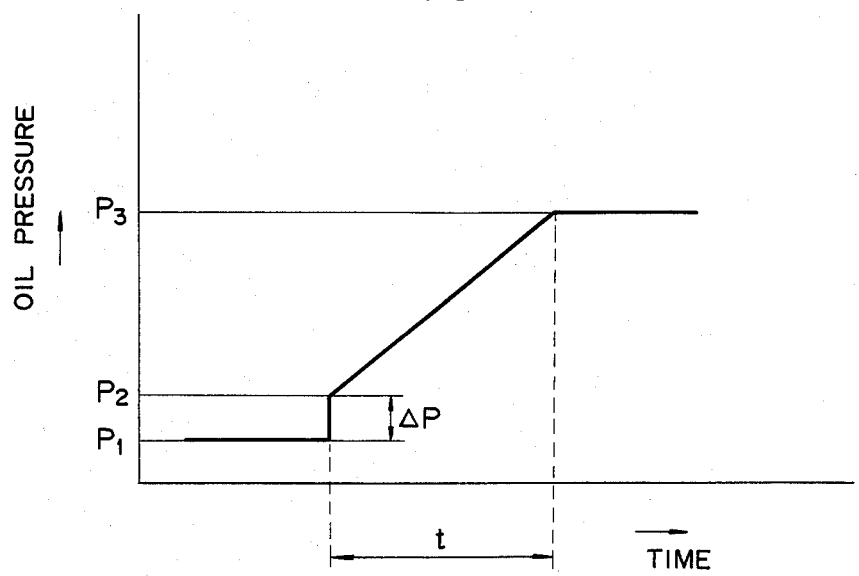
FIG. 3 is a graph showing the hydraulic pressure in a hydraulic circuit of FIG. 2 for various working times.

The foregoing functional relation is shown in FIG. 3, in which the abscissa represents a time and the ordinate gives an oil pressure in the hydraulic chamber S1 of the first speed clutch C1.

The pressure P2 is introduced through the oil path 62 and the orifice A2 to the hydraulic chamber S3 of the cylinder 59 also thus causing the piston 60 to move rightwards in FIG. 2 and thereby being fed back to the hydraulic chamber S1 of the first speed clutch C1, as much raising the pressure therein until the return port 64 becomes fully closed, as shown in FIG. 3. As the return port 64 is closed, the hydraulic pressure in the chamber S1 of the clutch C1 will progressively increase to a preset pressure P3 determined by the hydraulic control mechanism 30, thereby effecting a smooth engagement of the clutch C1 and thus favorably preventing the occurrence of the starting shock.

In FIG. 3, t represents a time taken for the progressive increase of the hydraulic pressure in the chamber S1 of the clutch C1. The time t is adjustable with the orifices A2 and A3, which may have their sizes suitably altered.

As will be understood from the foregoing description, the pressure progressive-increase mechanism 52 is of a simple constitution consisting of the cylinder 59, the piston 60 and the oil paths 61, 62 and 65, permitting a small-sized and light-weighted design.

Moreover, the pressure progressive-increase mechanism 52 is adapted to be functionable with the hydraulic pressure introduced from the chamber S1 of the first speed clutch C1 to the chamber S3 of the cylinder 59, thereby possibly reducing the leakage of oil and raising the reliability of function.

Figure 4:
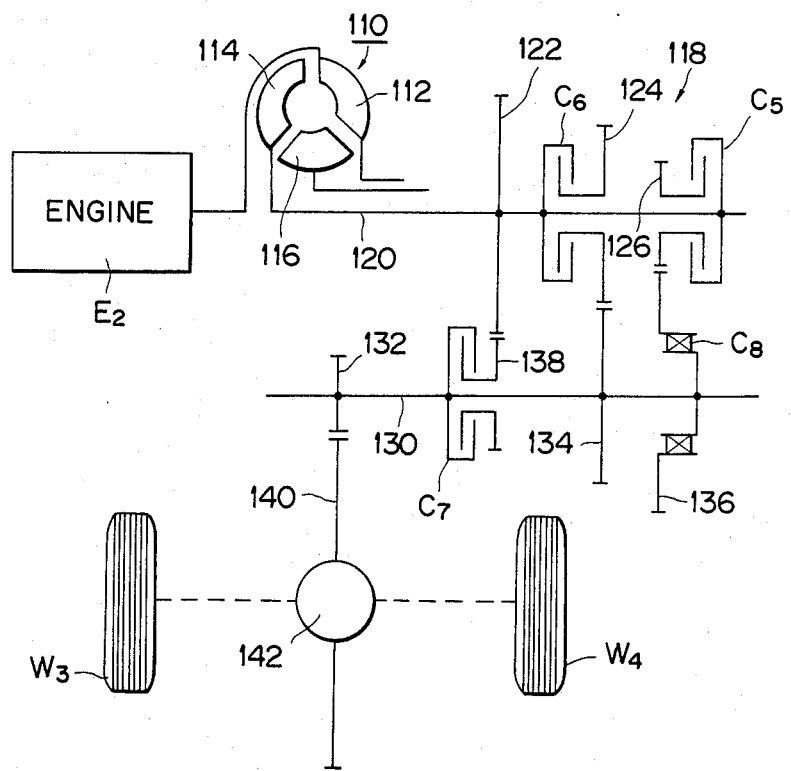
FIG. 4 is a transmission system diagram of a hydraulic shift transmission for vehicles according to a second embodiment of the invention.

Referring now to FIG. 4, an engine E2 has its output transmitted to a pump impeller 112 of a hydraulic torque converter 110 and therefrom hydrodynamically to a turbine impeller 114 thereof where the torque is amplified, while the reaction force is borne by a stator 116. The pump impeller 112 is coupled with a hydraulic pump 150 shown in FIG. 5.

The turbine impeller 114 is integrally jointed with a main shaft 120 of an auxilliary gearing 118, the main shaft 120 having, in order from the left in FIG. 4, a third speed drive gear 112, a second speed clutch C6 and a first speed clutch C5 fixed each thereto. The main shaft 120 is, as shown in FIG. 4, further provided with a second speed drive gear 124 and a first speed drive gear 126 loose-fitted thereon so as to be integrally rotatable therewith when the second and first speed clutches C6, C5 are brought in engagement, respectively.

On the other hand, in parallel with the main shaft 120, there is disposed a countershaft 130 having, in order from the left in FIG. 4, a final drive gear 132, a third speed clutch C7, a second speed driven gear 134 and a first speed driven gear 136 fixed each thereto, the first speed driven gear 136 including a one-way clutch C8 for transmitting the torque from the main shaft 120 only in the direction to the countershaft 130.

The countershaft 130 is further provided with a third speed driven gear 138 loose-fitted thereon so as to be integrally rotatable therewith when the third speed clutch C7 is brought in engagement.

The engine torque as transmitted to the final drive gear 132 is given to a final driven gear 140 which drives, through a differential gear 142 integrally assembled with the final driven gear 140, left and right front wheels W3, W4.

Figure 5:
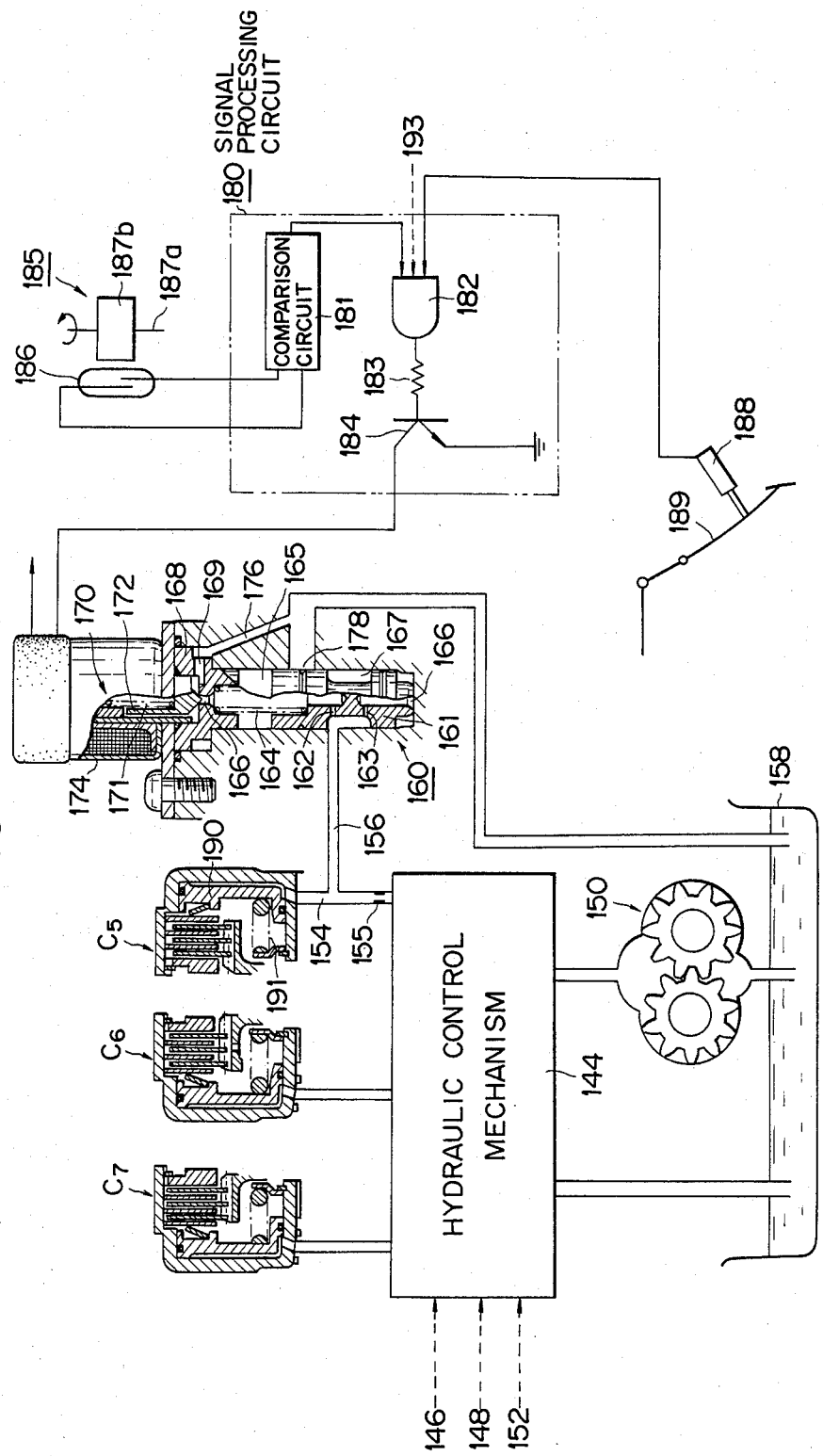
FIG. 5 is an electro-hydraulic circuit block diagram of the hydraulic shift transmission of FIG. 4.

Referring now to FIG. 5, a hydraulic control mechanism 144 supplies the delivery pressure of the hydraulic pump 150 to the clutches C5, C6 and C7 selectively in response to a vehicle speed signal 146 and a throttle opening signal 148. Moreover, the hydraulic control mechanism 144 receives a signal 152 according to the torque conversion ratio of the torque converter 110, thereby rendering variable the delivery pressure itself of the hydraulic pump 150.

Between the hydraulic control mechanism 144 and the first speed clutch C5 is installed an oil path 154 having an oil path 156 branched from downstream of the orifice 155. Between this oil path 156 and an oil reservoir 158, there is interposed a pressure release mechanism 160 including a release valve mechanism 170 of a pilot type. The pressure release mechanism 160 further includes a spool valve 161 as a piston member having orifices 162 and 163 formed therethrough for introducing the hydraulic pressure of the oil path 156 to upper and lower hydraulic chambers 165 and 166, respectively, and is normally biassed to the lower travel end thereof with the resilient force of a spring 164, thus interrupting the intercommunication through a ring slot 167 formed thereon between the oil path 156 and the oil reservoir 158.

The spring 164 is held at the upper end thereof in the lower part of a valve seat member 168 fitted in the upper hydraulic chamber 165, the valve seat member 168 having at the central part thereof an orifice 166' formed therethrough with a diameter larger than that of the above mentioned orifice 162. The orifice 166' of the valve seat member 168 is normally closed by a mobile core 172 biassed downwards in FIG. 5 with a spring 171 in the release valve mechanism 170, and becomes open only when a solenoid 174 is energized. Namely, when the mobile core 172 is lifted upwards, the upper hydraulic chamber 165 will communicate with the oil reservoir 158 through the orifice 166', a horizontal drain port 169 formed through the valve seat member 168 and a successive oil path 176.

In the above description, as will be understood from FIG. 5, the intercommunication between the oil path 156 and the oil reservoir 158 through the ring slot 167 is effectable with a return port 178 formed in a circle in the cross section thereof, the return port 178 having its effective open area gradually increasable with the upward travel of the spool valve 161.

Moreover, in FIG. 5, a signal processing circuit 180 is provided for controlling the release valve mechanism 170, and a vehicle speed detection circuit 185 is provided consisting of a reed switch 186 and a magnet 187b installed on a speedometer cable 187a. In the vehicle speed detection circuit 185, the rotation of the cable 187a is detected with the reed switch 186. The vehicle speed as detected is output from the detection circuit 185 to a comparison circuit 181 in the signal processing circuit 180, in which the detected vehicle speed is compared with a reference vehicle speed corresponding to a predetermined number of revolutions of the speedometer cable 187a and from which, according to the result of comparison, a threshold signal consisting of high or low level is output to an AND circuit 182.

Further, in FIG. 5, an idle detection switch 188 for the engine E2 sends to the AND circuit 182 a threshold signal of high or low level according to whether or not an acceleration pedal 189 is pressed. The AND circuit 182 has its output terminal connected through a resistance 183 to the base of a power transistor 184, which has the emitter thereof grounded and the collector connected to the solenoid 174 and further therethrough, though not shown, through an ignition switch to the plus terminal of a battery.

There will be described hereinbelow, the function of the above described hydraulic shift transmission according to the second embodiment of the invention.

While the vehicle is stopped with the engine E2 idling and a speed-shift lever (not shown) provided near the driver's seat is put in its advance position, the hydraulic control mechanism 144 will function to send the delivery pressure of the hydraulic pump 150 to the first speed clutch C5.

However, in the above state in which the comparison circuit 181 in the signal processing circuit 180 and the idle detection switch 188 are both producing their high level signals, thus energizing the solenoid 174 and thereby lifting the mobile core 172, the upper hydraulic chamber 165 of the spool valve mechanism 160 will have a considerably low pressure prevailing therein, so that the return port 178 is opened with the spool valve 161 urged upwards by the hydraulic pressure introduced in the lower hydraulic chamber 166. The effective open areas of the return port 178 depends on the upward travel of the spool valve 161 in the before mentioned manner. Namely, the upward travel of the spool valve 161 will stop when the hydraulic pressure acting on the lower end face thereof, that is, the hydraulic pressure applied to the first speed clutch C5 is reduced, with the increase in the effective open area of the return port 178, to a level balancing with a preset load of the spring 164. At this time, the movement of the spool valve 161 is favorably controlled with the orifices 162, 163, thereby stabilizing the hydraulic pressure in the first speed clutch C5. The hydraulic pressure is normally set to be substantially equal to or somewhat smaller than a preset load of a spring 191 arranged to bias a piston 190 in the disengagement direction of the clutch C5, so that in the normal state the clutch C5 is substantially lack of a sufficient engagement force, thus preventing the "creep". In addition thereto, the clutch C5 and the oil paths 154, 156 connected thereto have a faint pressure prevailing therein, thus being free from the occurrence of air bubbles and enabled to quickly response to the starting of vehicle.

As from the above state, when the acceleration pedal 189 is pressed, thus causing the idle detection switch 188 to output a low level signal, thereby deenergizing the solenoid 174 and closing the orifice 166' of the valve seat member 168, the spool valve 161 will have even pressures acting on both the upper and lower end faces thereof, while being biassed downwards by the spring 164. It is caused to travel in the same direction, gradually closing the return port 178, whereby the hydraulic pressure in the oil path 154, that is, the pressure in the first speed clutch C5 progressively increases. This permits a smooth starting of vehicle, whereas the degree of progressive increase of pressure depends on the cross section ratio of the orifices 162, 163 of the spool valve 161.

After the reference vehicle speed is exceeded, the comparison circuit 181 will output a low level signal, thus deenergizing the solenoid 174 irrespective of the position of the acceleration pedal 189.

In the foregoing second embodiment, in which the AND circuit 182 has two signals input therein in accordance with the vehicle speed and the throttle opening, a braking signal or a water temperature signal may be input therein as an additional signal 193 to effect the prevention of "creep" even while a brake pedal (not shown) is actuated or the engine water temperature is raised above a preset reference value, respectively. To this point, in an example in which a one-way clutch is provided in a transmission route adapted for the establishment of a first speed gear ratio as shown in FIG. 4, thereby rendering the engine brake ineffective in the first speed mode, there is no positive reason for applying a vehicle speed signal to an AND circuit.

Moreover, in the above embodiment, the throttle opening signal 148 may be substituted with any other physical volume representing the output of the engine E2, such as the negative pressure in a suction manifold (not shown).

Further, relative to the second embodiment, in which the pressure release mechanism 160 includes the hydraulic chambers 165, 166 defined by the upper and lower end faces of the spool valve 161, respectively, and the orifices 162, 163 formed through the spool valve 161 to introduce the inner pressure of the first speed clutch C5 to the chambers 165, 166 and in which the hydraulic oil in the upper chamber 165 is ventable through the electro-magnetically controlled release valve mechanism 170, there may be a modified example for accomplishing the same effect, in which the hydraulic pressure in an upper hydraulic chamber is normally held to be same as the inner pressure (atmospheric pressure) of an oil reservoir and that of a lower hydraulic chamber is released through a release valve mechanism.

Furthermore, in the second embodiment, in respect of the electromagnetic force of the solenoid 174, there is needed no more than overcoming a faint force as the result of the resilient force of the spring 171 minus a hydraulic force acting through the orifice 166', so that the solenoid 174 may be of a smallsized and lightweight design as well as of a type minimizing power consumption.

Still more, in the second embodiment, in which the spool valve 161 starts closing the return port 178 immediately after the orifice 166' is shut with the mobile core 172, there is favorably solved the object of the starting responsibility, in addition to that on account of the orifices 162, 163 the movement of the spool valve 161 is controlled to be moderate, which provides a pressure progressive-increase effect causing the hydraulic pressure in the first speed clutch C5 to rise gradually, thereby effecting a smooth starting of the vehicle.

Besides the above, in the second embodiment, in which the spool valve 161 serves as a pressure control valve while the solenoid 174 is excited for the prevention of "creep", the first speed clutch C5 and all oil paths related thereto are enabled to be pressurized at a predetermined pressure even when preventing the "creep", thus resulting in a favorable prevention of the delay of function.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

What is claimed is:

1. A hydraulic shift transmission for a vehicle including a hydraulic torque converter for transmitting a torque from an engine to a road wheel driving system, comprising:
    a plurality of gear trains interposed between the hydraulic torque converter and the road wheel driving system;
    said gear trains being different in the gear ratio;
    said gear trains including a first speed gear train adapted for the running at relatively low speeds;
    a plurality of clutch mechanisms alternatively installed in said gear trains;
    said clutch mechanisms being each hydraulically connectable and disconnectable;
    said clutch mechanisms including a first speed clutch mechanism installed in said first speed gear train having a spring with a preset load;
    a hydraulic control system for selectively supplying a hydraulic pressure to said clutch mechanisms in accordance with shift operations;
    an oil supply line connecting said hydraulic control mechanism to said first speed clutch mechanism;
    a release valve means, provided in the oil supply line, for releasing said hydraulic pressure while the vehicle speed is lower than a preset reference value with the engine idling;
    an oil return port open relative to said oil supply line and releasing said hydraulic pressure while opened;
    a piston member having an axis and being slidable axially for closing said return port;
    a resilient member normally biasing said piston member in one axial direction such that said piston member closes said return port;
    orifice means provided upstream of said return port for maintaining the pressure applied to the first speed clutch mechanism while said return port is open to be slightly less than the preset load of the clutch spring;
    and a hydraulic circuit means for, at least either when the vehicle speed becomes higher than said preset reference value or the engine is accelerated, gradually allowing said piston member to be moved in said one axial direction by the biasing of said resilient member.

2. A hydraulic shift transmission according to claim 1, wherein:
    said hydraulic circuit means has a cylinder provided with said piston member slidably fitted therein;
    said cylinder has first and second hydraulic chambers defined both thereby and separated from each other by said piston member;
    said first hydraulic chamber is hydraulically connected to said oil supply line and to said oil return port;
    and said second hydraulic chamber is hydraulically connected to said oil supply line and to said release valve mechanism.

3. A hydraulic shift transmission according to claim 2, wherein: said oil return port is formed in said cylinder and said resilient member is provided in said second hydraulic chamber.

4. A hydraulic shift transmission according to claim 3, wherein said oil return port is formed in said first hydraulic chamber.

5. A hydraulic shift transmission according to claim 3, wherein said oil return port is formed between said first and second hydraulic chambers; said piston member has a ring slot formed therein; and said ring slot communicates with said oil supply line and is communicatable with said oil return port.

6. A hydraulic shift transmission according to claim 5, wherein said piston member has first and second orifices formed therethrough for connecting said oil supply line to said first and second hydraulic chambers, respectively.

7. A hydraulic shift transmission according to claim 2, wherein said release valve mechanism comprises an electro-magnetic valve hydraulically connected to said oil supply line, a drain port arranged downstream of said electro-magnetic valve, and said orifice means being provided upstream of said drain port for holding said oil supply line at a faint pressure while said electro-magnetic valve is opened.

8. A hydraulic shift transmission according to claim 7, wherein said electro-magnetic valve comprises a solenoid member, a push-rod member actuatable with said solenoid member, and a ball member normally urged backwards with said hydraulic pressure in said oil supply line and said oil drain port, said ball member being forwardly pushable with said push-rod member.

9. A hydraulic shift transmission according to claim 8, wherein said orifice means comprises an oil path having said push-rod member loose-fitted therein.

10. A hydraulic shift transmission according to claim 8, wherein the vehicle further includes a speedometer cable and an acceleration pedal; and said solenoid member is controlled with a vehicle speed signal based on the number of revolutions of the speedometer cable and with a running mode signal based on the position of the acceleration pedal.

11. A hydraulic shift transmission according to claim 7, wherein said electro-magnetic valve comprises a solenoid member, a mobile core member normally urged backwards with said hydraulic pressure as introduced in said second hydraulic chamber, said mobile core being actuatable with said solenoid member, a valve seat member adapted for the seating of said mobile core member, and a spring member normally forwardly biassing said mobile core member.

12. A hydraulic shift transmission according to claim 11, wherein said orifice means comprises an orifice formed through said piston member for connecting said oil supply line to said second hydraulic chamber.

13. A hydraulic shift transmission according to claim 11, wherein the vehicle further includes a speedometer cable and an acceleration pedal; and said solenoid member is controlled with a vehicle speed signal based on the number of revolutions of the speedometer cable and with a running mode signal based on the position of the acceleration pedal.

* * * * *